（12） United States Patent
Sedlack, II

(10) Patent No.: US 10,661,860 B2
(45) Date of Patent: May 26, 2020

(54) WATER DIVERTER FOR OUTBOARD MARINE MOTORS

(71) Applicant: Vallery Industries, Inc., Stuart, FL (US)

(72) Inventor: Russell L. Sedlack, II, Stuart, FL (US)

( * ) Notice: Subject to any disclaimer, the term of this patent is extended or adjusted under 35 U.S.C. 154(b) by 0 days.

(21) Appl. No.: 16/217,892

(22) Filed: Dec. 12, 2018

(65) Prior Publication Data

US 2019/0176933 A1  Jun. 13, 2019

Related U.S. Application Data

(60) Provisional application No. 62/597,493, filed on Dec. 12, 2017.

(51) Int. Cl.
*B63B 1/24* (2020.01)
*B63B 1/26* (2006.01)
*B63B 1/32* (2006.01)
*B63B 1/00* (2006.01)

(52) U.S. Cl.
CPC .................. *B63B 1/32* (2013.01); *B63B 1/00* (2013.01); *B63B 2001/005* (2013.01)

(58) Field of Classification Search
CPC ......... B63B 1/00; B63B 1/32; B63B 2001/00; B63B 2001/005; B63B 2001/32; B63B 2001/325
USPC .................................... 440/66; 114/271, 278
See application file for complete search history.

(56) References Cited

U.S. PATENT DOCUMENTS

| | | | |
|---|---|---|---|
| 1,827,806 A * | 10/1931 | Aitken | B63B 3/40 440/66 |
| 2,787,974 A | 4/1957 | Johnson | |
| 2,912,955 A | 11/1959 | Leipert | |
| 3,075,490 A | 1/1963 | Lang | |
| 3,768,432 A * | 10/1973 | Spaulding | B63H 5/16 440/66 |
| 4,449,945 A | 5/1984 | Ferguson | |
| 4,657,513 A | 4/1987 | Baker | |
| 4,739,644 A | 4/1988 | Happel | |
| 4,875,882 A | 10/1989 | Plitt et al. | |
| 4,878,865 A * | 11/1989 | Makihara | B63H 20/10 440/66 |
| 5,138,966 A | 8/1992 | Whitley, II | |
| 5,203,278 A | 4/1993 | Brauner et al. | |

(Continued)

*Primary Examiner* — Daniel V Venne
(74) *Attorney, Agent, or Firm* — Scott T. Griggs; Griggs Bergen LLP

(57) ABSTRACT

A water diverter for outboard marine motors is presented. In one embodiment, the water diverter is adapted to be secured to a transom bracket which includes a portion adapted to be mounted on a boat transom. The water diverter includes a body and a bracket. The body has a horizontal deflection plate with a triangular shape. Two vertical deflection plates extend upward along the edges of the horizontal deflection plate. The bracket includes a horizontal mounting surface having a triangular shape. Two vertical attachment walls extend downward along the sides of the horizontal mounting surface. The bracket is sized to fit within the body with alignment of attachment openings of the vertical deflection plates and attachment holes of the vertical attachment walls determining a fastener-based selectively adjustable vertical displacement between the horizontal deflection plate and the horizontal mounting surface.

10 Claims, 3 Drawing Sheets

(56) References Cited

U.S. PATENT DOCUMENTS

| | | | | |
|---|---|---|---|---|
| 5,350,327 | A | * | 9/1994 | Self ............... B63B 39/061 |
| | | | | 114/274 |
| 6,283,807 | B1 | | 9/2001 | Kokubo et al. |
| 8,545,280 | B1 | | 10/2013 | Patil et al. |
| 8,834,216 | B1 | * | 9/2014 | Calamia ............ B63H 20/08 |
| | | | | 114/274 |

* cited by examiner

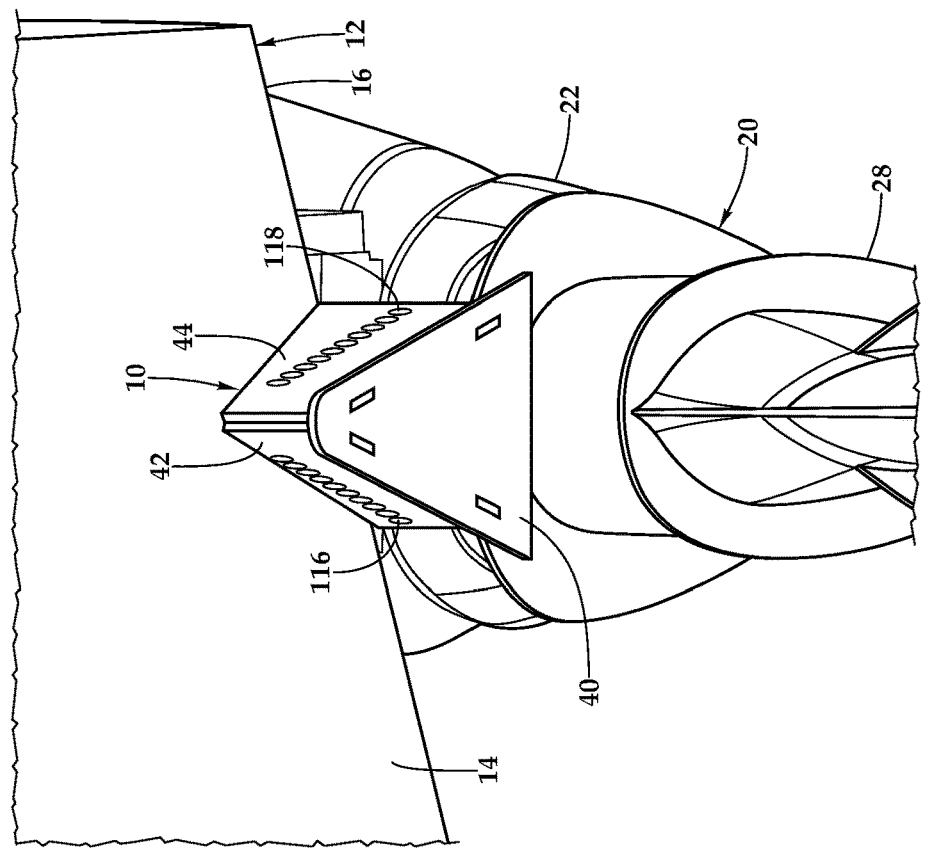
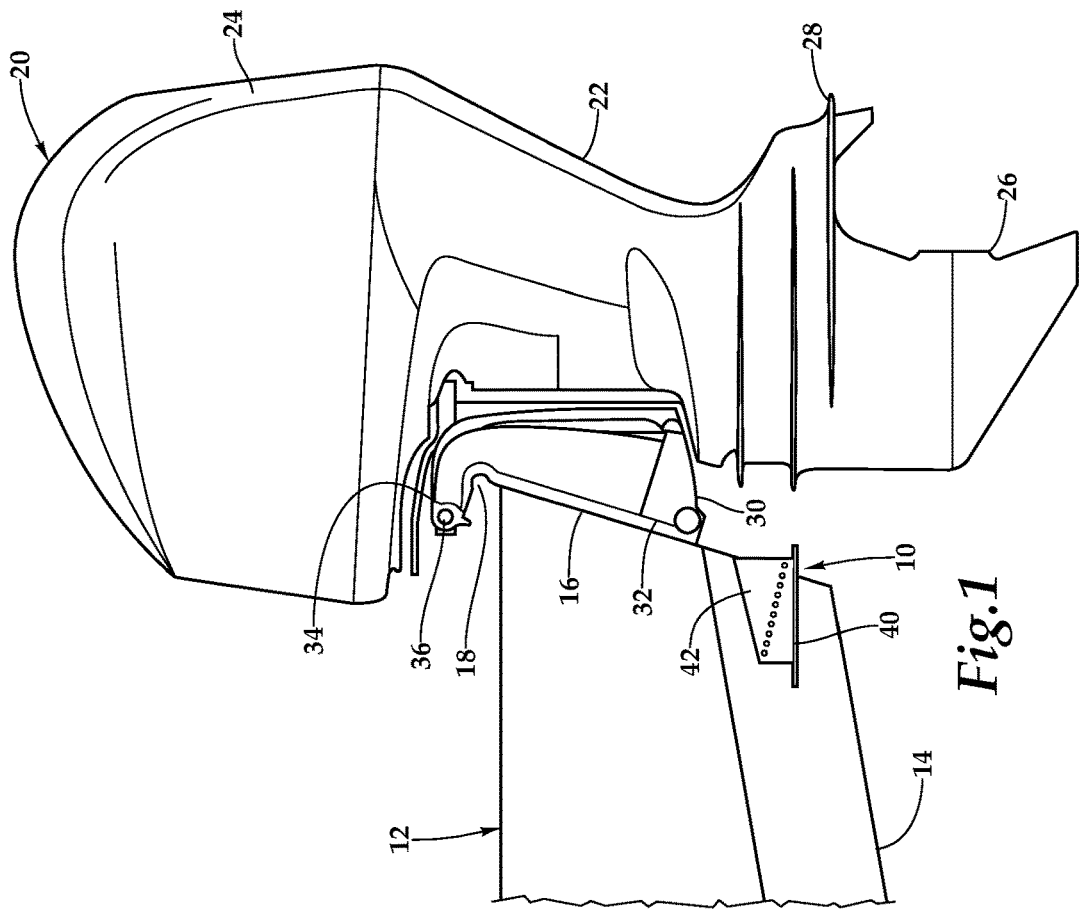

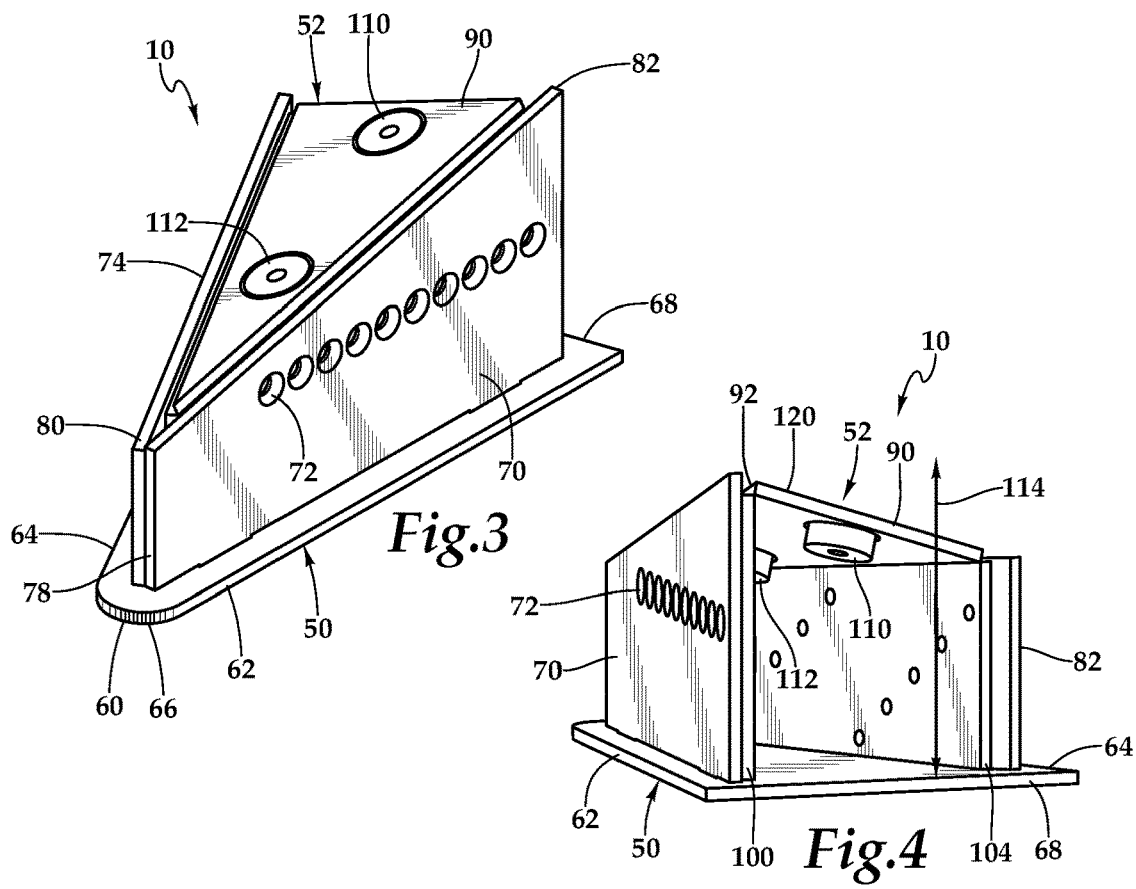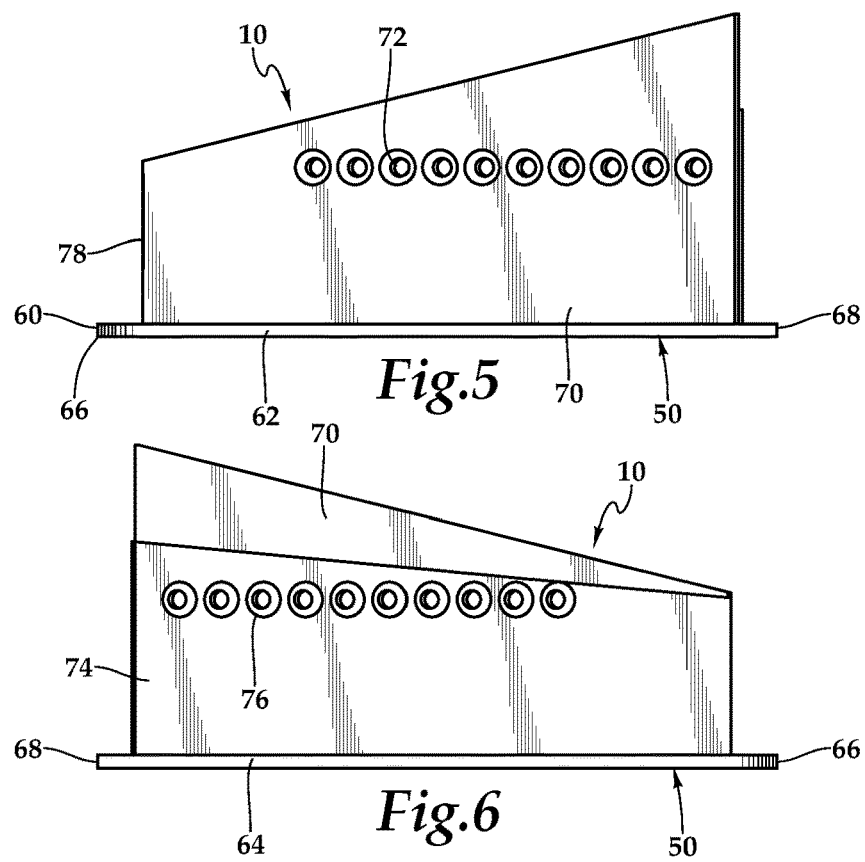

WATER DIVERTER FOR OUTBOARD MARINE MOTORS

PRIORITY STATEMENT & CROSS-REFERENCE TO RELATED APPLICATIONS

This application claims priority from U.S. Patent Application Ser. No. 62/597,493 entitled "Water Diverter for Outboard Marine Motors" filed on Dec. 12, 2017, in the name of Russell L. Sedlack II; which is hereby incorporated by reference for all purposes.

TECHNICAL FIELD OF THE INVENTION

This invention relates, in general, to a water diverter for outboard marine motors and, in particular, to a water diverter adapted to be secured to a transom bracket which includes a portion adapted to be mounted on a boat transom for a boat utilizing an outboard marine motor.

BACKGROUND OF THE INVENTION

Outboard marine motors conventionally include one or more propulsion units having a power head including an internal combustion engine. Each propulsion unit may also include a lower unit having a rotatably mounted propeller drivingly connected to the engine. Extended transom brackets are often used to permit outboard marine motors to be mounted on the transoms of boat hulls. Extended transom brackets commonly support the propulsion unit or propulsion units in a position which is spaced a substantial distance rearwardly of the trailing edge of the bottom of the boat hull. A common problem with extended transom brackets is that there is excessive water spray around the lower unit and mid-section of the motor. This common problem is exasperated when multiple outboard marine motors are utilized. Accordingly, there is a need for improved devices for mitigating excessive water spray with an easy-to-install design.

SUMMARY OF THE INVENTION

It would be advantageous to achieve a device that would mitigate excessive water spray. It would also be desirable to enable a mechanical-based solution that would be easy to install and optionally adjustable to accommodate different outboard marine motor configurations. To better address one or more of these concerns, a water diverter for outboard marine motors is presented. In one embodiment, the water diverter is adapted to be secured to a transom bracket which includes a portion adapted to be mounted on a boat transom. The water diverter includes a body and a bracket. The body has a horizontal deflection plate with a triangular shape. Two vertical deflection plates extend upward along the edges of the horizontal deflection plate. The bracket includes a horizontal mounting surface having a triangular shape. Two vertical attachment walls extend downward along the sides of the horizontal mounting surface. The bracket is sized to fit within the body with alignment of attachment openings of the vertical deflection plates and attachment holes of the vertical attachment walls determining a fastener-based selectively adjustable vertical displacement between the horizontal deflection plate and the horizontal mounting surface. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a side elevation view depicting one embodiment of a boat utilizing a water diverter for an outboard marine motor, according to the teachings presented herein;

FIG. 2 is a bottom view of the boat depicted in FIG. 1 utilizing the water diverter;

FIG. 3 is a front perspective view of one embodiment of the water diverter;

FIG. 4 is a rear perspective view of the water diverter depicted in FIG. 3;

FIG. 5 is a front perspective view of one embodiment of a body, which forms a portion of the water diverter;

FIG. 6 is a right-side elevation view of the body depicted in FIG. 5;

DETAILED DESCRIPTION OF THE INVENTION

Figure 7:
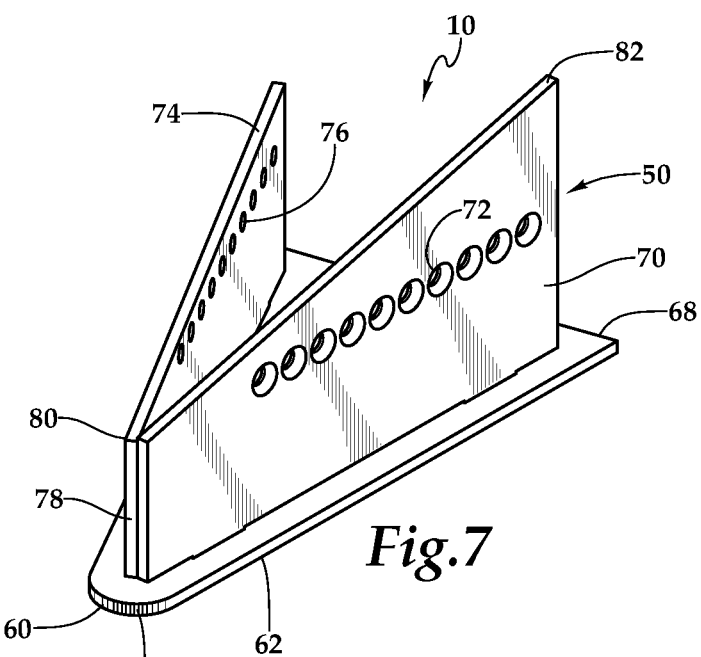
FIG. 7 is a left-side elevation view of the body depicted in FIG. 5.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1 and FIG. 2, therein is depicted a water diverter for outboard marine motors which is schematically illustrated and designated 10. The water diverter 10 is installed on a boat 12 having a hull 14 and a transom 16. As shown, the transom 16 supports a propulsion unit mounting assembly 18 that extends rearwardly from the stern of the boat 12 to install an outboard marine motor 20 rearwardly of the transom of the boat 12 and in spaced relation from the transom 16. The outboard marine motor 20 includes a lower unit 22 extending downwardly from a power head 24 and a propeller 26, which is mounted on the lower end of the lower unit 22. As is conventional, the lower unit 22 also includes a water deflection plate 28 above the propeller 26. In one embodiment, the propulsion unit mounting assembly 18 includes a transom bracket having a mounting portion 32 adapted to be secured to the transom 16. The mounting portion 32 includes a swivel bracket assembly 34 for swinging movement of the swivel bracket assembly 34 about a generally horizontal pin 36.

The water diverter 10 extends downwardly from the hull 14 of the boat 12 and defines various deflection surfaces, such as surfaces 40, 42, 44. The water diverter 10 functions to provide a planning area and prevents water from impinging against upper portions of the outboard marine motor 20 as the hull 14 of the boat 12 is propelled through the water under propulsion of the outboard marine motor 20. The water diverter 10 may be directly mounted to the hull 14 of the boat or attached by another technique such as with a transom bracket 30, which is mounted to the transom 16 of the boat. Further, it should be appreciated that the water diverter 10 is applicable to boats where multiple outboard marine motors may be utilized. Additionally, it should be appreciated that although a particular boat 12 and outboard marine motor 20 configuration is depicted in FIGS. 1 and 2, the water diverter 10 and teachings presented herein are applicable to other boat and outboard marine motor configurations. The boat 12 and outboard marine motor 20 configuration of FIGS. 1 and 2 is presented by way of a non-limiting example for purposes of explanation of the teachings presented herein. By way of further example, the water diverter 10 presented herein may be employed with an integrated bracket where the boat manufacturer has molded into the hull a configuration that mimics a bolt on the outboard bracket. It should be appreciated that although a particular location of the water diverter 10 is depicted, the location of the water diverter 10 on the boat 12 may vary depending on the type of boat.

Figure 8:
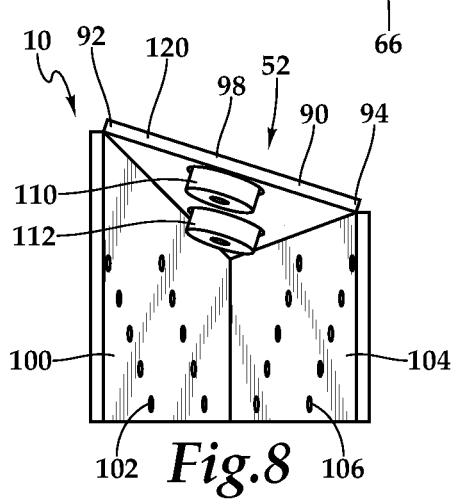
FIG. 8 is a front elevation view of one embodiment of a bracket, which forms a portion of the water diverter.
Figure 9:
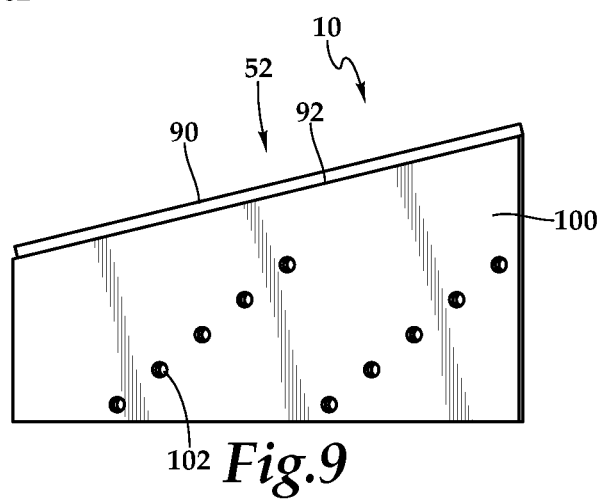
FIG. 9 is a rear elevation view of the bracket depicted in FIG. 8.
Figure 10:
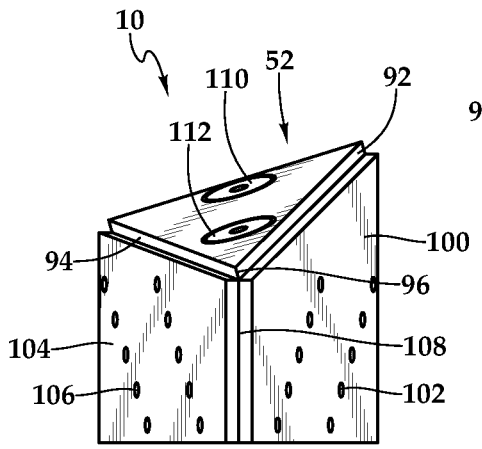
FIG. 10 is a right-side elevation view of the bracket depicted in FIG. 8.
Figure 11:
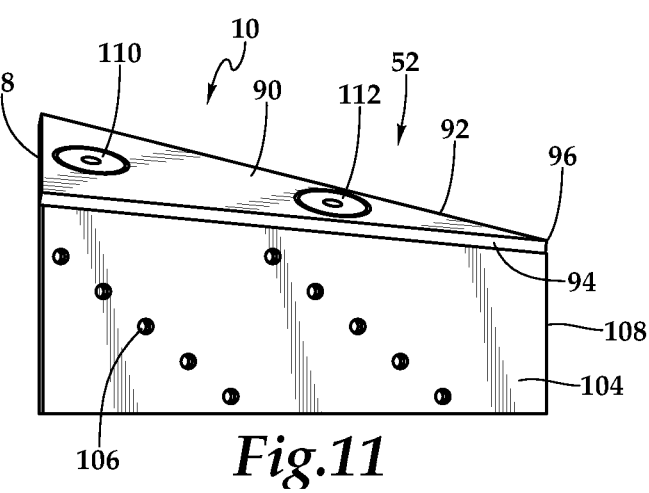
FIG. 11 is a right-side elevation view of the bracket depicted in FIG. 8.

Referring now to FIG. 3 through FIG. 11, in one embodiment, the water diverter 10 includes a body 50 and a bracket 52. The body 50 includes a horizontal deflection plate 60 having a triangular shape with sides 62, 64 extending from a body vertex angle 66 to a body base 68. The horizontal deflection plate 60 has a bow-facing end at the body vertex angle 66 and a stern-facing end at the body base 68. The body vertex angle 66 may be between 20 degrees and 40 degrees and may be 30 degrees. A vertical deflection plate 70 may have a rectangular shape and the vertical deflection plate 70 may extend upward and parallel along the side 62 from the body vertex angle 66 to the body base 68. As shown, the vertical deflection plate 70 includes attachment openings 72 therethrough. Similarly, a vertical deflection plate 74 may have a rectangular shape and extend upward and parallel along the side 64 from the body vertex angle to the body base 68. The vertical deflection plate 74 includes attachment openings 76 therethrough. As shown, the vertical deflection plate 70 and the vertical deflection plate 74 converge at a point 78 at the body vertex angle 66. The vertical deflection plate 70 and the vertical deflection plate 74 define a V at 80 in a horizontal plane directed to the bow-facing end of the boat 12 and the vertical deflection plate 70 and the vertical deflection plate 74 form an open end 82 directed to the stern-facing end.

In one embodiment, the bracket 52 includes a horizontal mounting surface 90 having a triangular shape with sides 92, 94 extending from a bracket vertex angle 96 to a bracket base 98. The horizontal mounting surface 90 may include a bow-facing end at the bracket vertex angle 96 and a stern-facing end at the bracket base 98. In one embodiment, the bracket vertex angle 96 may be between 20 degrees and 40 degrees and may be 30 degrees. Further, the body vertex angle 66 and the bracket vertex angle 96 may be identical. A vertical attachment wall 100 includes a rectangular shape and extends downward along the side 92 from the bracket vertex angle 96 to the bracket base 98. As shown, the vertical attachment wall 100 includes multiple attachment holes 102. Similarly, a vertical attachment wall 104 has a rectangular shape and extends downward along the side 94 from the bracket vertex angle 96 to the bracket base 98. The vertical attachment wall includes attachment holes 106. As illustrated, the vertical attachment wall 100 and the vertical attachment wall 104 converge at a point 108 at the bracket vertex angle 96. At least one bracket attachment is located in the horizontal mounting surface 90 in order to secure the water diverter 10 to the hull 14. As shown, bracket attachments 110, 112 are present.

The bracket 52 is sized to fit within the body 50. The respective alignment of the attachment openings 72 with the attachment holes 102 and the attachment openings 76 with the attachment holes 106 determines an optionally fastener-based selectively adjustable vertical displacement 114 between the horizontal deflection plate 60 and the horizontal mounting surface 90. As shown, fasteners 116, 118 determine the vertical displacement 114 between the horizontal deflection plate 60 and the horizontal mounting surface 90. In one embodiment, the vertical deflection plate 70 may be wider than the vertical deflection plate 74 and, similarly, the vertical attachment wall 100 may be wider than the vertical attachment wall 104. With this configuration, the horizontal mounting surface 90 of the bracket 52 presents an angled face of engagement 120 to the hull 14 of the boat 12.

In another embodiment, the bracket 52 is sized to fit within the body 50 and fastened thereto. In this embodiment, fasters are not utilized to determine the vertical displacement 114 between the horizontal deflection plate 60 and the horizontal mounting surface 90. Rather, this placement is fixed. Such an embodiment may be used in original equipment manufacturer deployments and in other uses.

The order of execution or performance of the methods and operational steps illustrated and described herein is not essential, unless otherwise specified. That is, elements of the methods and operational steps may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A water diverter adapted to be secured to a hull of a boat, the water diverter comprising:
   a body including:
      a horizontal deflection plate having a triangular shape with first and second sides extending from a body vertex angle to a body base, the horizontal deflection plate having a bow-facing end at the body vertex angle and a stern-facing end at the body base,
      a first vertical deflection plate having a rectangular shape, the first vertical deflection plate extending upward and parallel along the first side from the body vertex angle to the body base, the first vertical deflection plate including a plurality of first attachment openings therethrough, and
      a second vertical deflection plate having a rectangular shape, the second vertical deflection plate extending upward and parallel along the second side from the body vertex angle to the body base, the second vertical deflection plate including a plurality of second attachment openings therethrough, the first vertical deflection plate and the second vertical deflection plate converging at a point at the body vertex angle;
a bracket including:
a horizontal mounting surface having a triangular shape with first and second sides extending from a bracket vertex angle to a bracket base, the horizontal mounting surface having a bow-facing end at the bracket vertex angle and a stern-facing end at the base,
a first vertical attachment wall having a rectangular shape, the first vertical attachment wall extending downward along the first side from the bracket vertex angle to the bracket base, the first vertical attachment wall including a plurality of first attachment holes,
a second vertical attachment wall having a rectangular shape, the second vertical attachment wall extending downward along the second side from the bracket vertex angle to the bracket base, the second vertical attachment wall including a plurality of second attachment holes, the first vertical attachment wall and the second vertical attachment wall converging at a point at the bracket vertex, and
at least one bracket attachment being located in the horizontal mounting surface, the at least one bracket attachment configured to be secured to the hull of the boat; and
the bracket being sized to fit within the body, the respective alignment of the first attachment openings with the first attachment holes and the second attachment openings with the second attachment holes determining a fastener-based selectively adjustable vertical displacement between the horizontal deflection plate and the horizontal mounting surface.

2. The water diverter as recited in claim 1, wherein the plurality of first attachment openings further comprise a line of ten first attachment openings, each of the ten first attachment openings being at a different height and ascending from the bow-facing end to the stern-facing end.

3. The water diverter as recited in claim 1, wherein the plurality of first attachment openings further comprise:
a first line of five attachment openings, each of the first line of five attachment openings being at a different height and descending from the bow-facing end to the stern-facing end; and
a second line of five attachment openings, each of the second line of five attachment openings being at a different height and descending from the bow-facing end to the stern-facing end, the second line of five attachment openings being parallel to the first line of five attachment openings.

4. The water diverter as recited in claim 1, wherein the at least one bracket attachment is configured to be secured to the hull of the boat with a transom bracket which is mounted to a transom of the boat.

5. The water diverter as recited in claim 1, wherein the body vertex angle comprises an angle of 30 degrees.

6. The water diverter as recited in claim 1, wherein the body vertex angle comprises an angle between 20 degrees and 40 degrees.

7. The water diverter as recited in claim 1, wherein the first vertical deflection plate and the second vertical deflection plate define a V in a horizontal plane directed to the bow-facing end.

8. The water diverter as recited in claim 1, wherein the first vertical deflection plate and the second vertical deflection plate form an open end directed to the stern-facing end.

9. A water diverter adapted to be secured to a hull of a boat, the water diverter comprising:
a body including:
a horizontal deflection plate having a triangular shape with first and second sides extending from a body vertex angle to a body base, the horizontal deflection plate having a bow-facing end at the body vertex angle and a stern-facing end at the body base,
a first vertical deflection plate having a rectangular shape, the first vertical deflection plate extending upward and parallel along the first side from the body vertex angle to the body base, the first vertical deflection plate including a plurality of first attachment openings therethrough, and
a second vertical deflection plate having a rectangular shape, the second vertical deflection plate extending upward and parallel along the second side from the body vertex angle to the body base, the second vertical deflection plate including a plurality of second attachment openings therethrough, the first vertical deflection plate and the second vertical deflection plate converging at a point at the body vertex angle;
a bracket including:
a horizontal mounting surface having a triangular shape with first and second sides extending from a bracket vertex angle to a bracket base, the horizontal mounting surface having a bow-facing end at the bracket vertex angle and a stern-facing end at the base,
a first vertical attachment wall having a rectangular shape, the first vertical attachment wall extending downward along the first side from the bracket vertex angle to the bracket base, the first vertical attachment wall including a plurality of first attachment holes,
a second vertical attachment wall having a rectangular shape, the second vertical attachment wall extending downward along the second side from the bracket vertex angle to the bracket base, the second vertical attachment wall including a plurality of second attachment holes, the first vertical attachment wall and the second vertical attachment wall converging at a point at the bracket vertex, and
at least one bracket attachment being located in the horizontal mounting surface, the at least one bracket attachment configured to be secured to the hull of the boat;
the first vertical deflection plate being wider than the second vertical deflection plate and the first vertical attachment wall being wider than the second vertical attachment wall;
the horizontal mounting surface of the bracket presenting an angled face of engagement to the hull of the boat;
the bracket being sized to fit within the body, the respective alignment of the first attachment openings with the first attachment holes and the second attachment openings with the second attachment holes determining a fastener-based selectively adjustable vertical displacement between the horizontal deflection plate and the horizontal mounting surface.

10. A water diverter adapted to be secured to a hull of a boat, the water diverter comprising:
a body including:
a horizontal deflection plate having a triangular shape with first and second sides extending from a body vertex angle to a body base, the horizontal deflection plate having a bow-facing end at the body vertex angle and a stern-facing end at the body base, the body vertex angel being 30 degrees, a first vertical deflection plate having a rectangular shape, the first vertical deflection plate extending upward and parallel along the first side from the body vertex angle to the body base, the first vertical deflection plate including a plurality of first attachment openings therethrough, a second vertical deflection plate having a rectangular shape, the second vertical deflection plate extending upward and parallel along the second side from the body vertex angle to the body base, the second vertical deflection plate including a plurality of second attachment openings therethrough, the first vertical deflection plate and the second vertical deflection plate converging at a point at the body vertex angle, the first vertical deflection plate and the second vertical deflection plate define a V in a horizontal plane directed to the bow-facing end, and the first vertical deflection plate and the second vertical deflection plate form an open end directed to the stern-facing end;

a bracket including:

a horizontal mounting surface having a triangular shape with first and second sides extending from a bracket vertex angle to a bracket base, the horizontal mounting surface having a bow-facing end at the bracket vertex angle and a stern-facing end at the bracket base, the bracket vertex angle being 30 degrees, a first vertical attachment wall having a rectangular shape, the first vertical attachment wall extending downward along the first side from the bracket vertex angle to the bracket base, the first vertical attachment wall including a plurality of first attachment holes, a second vertical attachment wall having a rectangular shape, the second vertical attachment wall extending downward along the second side from the bracket vertex angle to the bracket base, the second vertical attachment wall including a plurality of second attachment holes, the first vertical attachment wall and the second vertical attachment wall converging at a point at the bracket vertex, and at least one bracket attachment being located in the horizontal mounting surface, the at least one bracket attachment configured to be secured to the hull of the boat; and the bracket being sized to fit within the body, the respective alignment of the first attachment openings with the first attachment holes and the second attachment openings with the second attachment holes determining a fastener-based selectively adjustable vertical displacement between the horizontal deflection plate and the horizontal mounting surface.

\* \* \* \* \*